(12) United States Patent
Plattner et al.

(10) Patent No.: US 11,217,047 B2
(45) Date of Patent: Jan. 4, 2022

(54) METHOD FOR VERIFYING A PREDEFINED MAXIMUM SPATIAL DISTANCE OF A RADIO KEY IN RELATION TO A MOTOR VEHICLE, AS WELL AS CONTROL DEVICE, MOTOR VEHICLE AND RADIO KEY

(71) Applicant: Continental Automotive GmbH, Hannover (DE)

(72) Inventors: Franz Plattner, Arnschwang (DE); Stefan Hermann, Neunkirchen am Brand (DE); Alexander Heinrich, Donaustauf (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/481,316

(22) PCT Filed: Jan. 9, 2018

(86) PCT No.: PCT/EP2018/050475
§ 371 (c)(1),
(2) Date: Jul. 26, 2019

(87) PCT Pub. No.: WO2018/137923
PCT Pub. Date: Aug. 2, 2018

(65) Prior Publication Data
US 2019/0355196 A1    Nov. 21, 2019

(30) Foreign Application Priority Data

Jan. 27, 2017   (DE) .................... 10 2017 201 308.7

(51) Int. Cl.
*G01S 5/02* (2010.01)
*G07C 9/00* (2020.01)
(Continued)

(52) U.S. Cl.
CPC .......... *G07C 9/00309* (2013.01); *B60R 25/24* (2013.01); *G01S 5/02* (2013.01);
(Continued)

(58) Field of Classification Search
CPC .............. B60R 25/24; B60R 2325/101; B60R 2325/103; B60R 25/01; B60R 25/209;
(Continued)

(56) References Cited

U.S. PATENT DOCUMENTS 6,208,239 B1   3/2001   Mueller et al.
6,346,878 B1   2/2002   Pohlman et al.
(Continued)

FOREIGN PATENT DOCUMENTS

DE    10045776 A1    4/2002
DE    10317658 A1    11/2004
(Continued)

OTHER PUBLICATIONS

International Search Report and Written Opinion dated Apr. 5, 2018 from corresponding International Patent Application No. PCT/EP2018/050475.

*Primary Examiner* — Dionne Pendleton

(57) ABSTRACT

The invention relates to a method for verifying a prescribed maximum physical distance (MAX) of a radio key (11) in relation to a motor vehicle (10), wherein a control apparatus (26) uses a radio device (21) of the motor vehicle (10) to transmit at least one electromagnetic radio signal to the radio key (11) and subsequently receives a respective electromagnetic response signal and, for each radio signal, takes the radio signal and the associated response signal as a basis in each case for using a signal propagation delay measurement to ascertain a respective signal propagation delay and checks whether the signal propagation delay fails to satisfy a predetermined propagation delay criterion (27), and signals (Continued)

a transgression above the propagation delay (28) when the propagation delay criterion (27) is not satisfied.

17 Claims, 1 Drawing Sheet

(51) Int. Cl.
*B60R 25/24* (2013.01)
*H04B 7/06* (2006.01)
*H04B 7/04* (2017.01)

(52) U.S. Cl.
CPC .............. *H04B 7/04* (2013.01); *H04B 7/0608* (2013.01); *G07C 2009/00555* (2013.01); *G07C 2209/63* (2013.01)

(58) Field of Classification Search
CPC ... B60R 25/241; B60R 25/245; B60R 25/252; B60R 25/255; B60R 25/257; G07C 9/00309; G07C 2209/63; G07C 2009/00555; G07C 2009/00412; G07C 2009/00547; G07C 2009/00769; G07C 2009/00793; G07C 2009/00333; G07C 2009/00341; G07C 2009/00365; G07C 2009/00373; G07C 2009/00396; G07C 2009/005; G07C 2009/00507; G07C 2009/00777; G07C 2209/06; G07C 9/29; G07C 2009/00261; H04W 4/023; H04W 4/029; H04W 4/40; H04W 12/0609; H04W 4/026; H04W 4/027; H04W 4/80; H04W 84/10; H04W 88/06; H04W 8/005; H04W 12/069; G01C 21/165; G01C 21/18; G01S 13/0209; G01S 13/32; G01S 13/36; G01S 13/74; G01S 13/76; G01S 13/765; G01S 13/82; G01S 13/825; G06F 21/34; G08C 17/02; H04B 1/59; H04B 1/69; H04B 2201/70715; E05B 49/00; E05B 81/54; E05B 81/64; E05B 85/01; B60N 2/002

See application file for complete search history.

(56) References Cited

U.S. PATENT DOCUMENTS

| | | | |
|---|---|---|---|
| 2002/0067250 A1 | 6/2002 | Kamiah | |
| 2006/0034206 A1 | 2/2006 | Jacobi et al. | |
| 2013/0094439 A1* | 4/2013 | Moshfeghi | H04W 88/02 |
| | | | 370/328 |
| 2014/0058586 A1 | 2/2014 | Kalhous et al. | |
| 2014/0308971 A1 | 10/2014 | O'Brien et al. | |
| 2015/0235486 A1* | 8/2015 | Ellis | G07C 9/00309 |
| | | | 340/5.61 |
| 2016/0191120 A1* | 6/2016 | Dobyns | H04B 5/0075 |
| | | | 455/41.1 |
| 2017/0212210 A1* | 7/2017 | Chen | G01S 5/06 |
| 2017/0236351 A1 | 8/2017 | Menard et al. | |
| 2018/0029560 A1* | 2/2018 | Mohaupt | B60N 2/002 |
| 2018/0093642 A1* | 4/2018 | Casagrande | G06F 21/34 |
| 2018/0148015 A1 | 5/2018 | Weghaus | |
| 2018/0284291 A1* | 10/2018 | Marmet | G01S 19/46 |
| 2019/0016302 A1* | 1/2019 | Saiki | G08C 17/02 |
| 2019/0283710 A1* | 9/2019 | Yamaguchi | H04W 4/023 |

FOREIGN PATENT DOCUMENTS

| | | |
|---|---|---|
| DE | 102008008089 A1 | 8/2009 |
| DE | 102011089794 A1 | 6/2013 |
| DE | 102013216099 A1 | 2/2014 |
| DE | 102014200159 A1 | 10/2014 |
| DE | 102015109468 A1 | 12/2016 |
| EP | 0992408 A2 | 4/2000 |
| EP | 1033585 A2 | 9/2000 |
| WO | 2004036242 A1 | 4/2004 |
| WO | 2016046105 A1 | 3/2016 |

\* cited by examiner

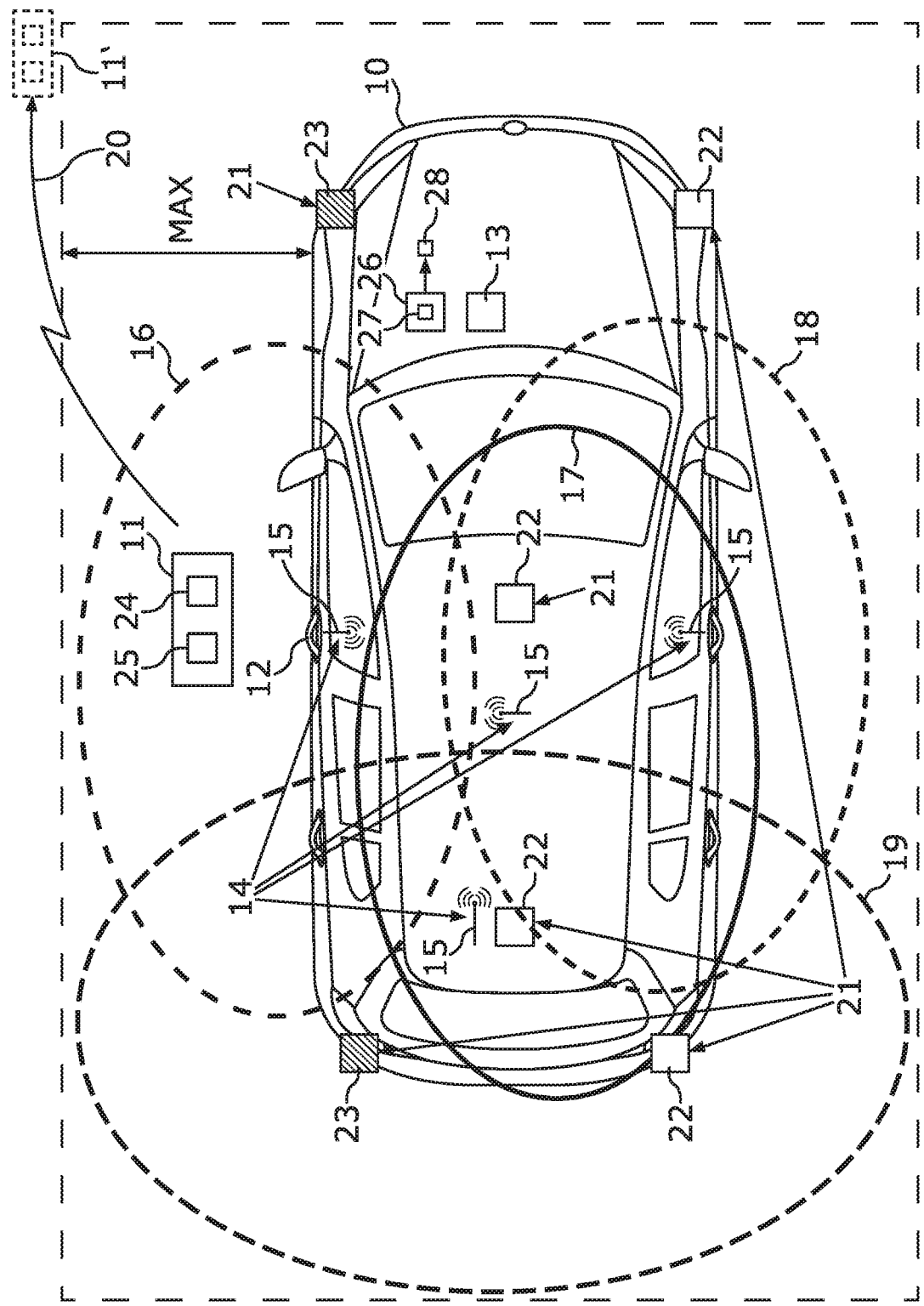

METHOD FOR VERIFYING A PREDEFINED MAXIMUM SPATIAL DISTANCE OF A RADIO KEY IN RELATION TO A MOTOR VEHICLE, AS WELL AS CONTROL DEVICE, MOTOR VEHICLE AND RADIO KEY

The invention relates to a method for verifying that a distance of a radio key from a motor vehicle is within a prescribed maximum physical distance. The invention also includes a control apparatus for performing the method, a motor vehicle having the control apparatus and a radio key.

To authorize a person for a locking system of a motor vehicle and/or an immobilizer of the motor vehicle, the person can carry a radio key. If the radio key is detected within a prescribed maximum distance of the motor vehicle or even inside the motor vehicle and the radio key reacts to what is known as a challenge signal with the correct response, then the motor vehicle is subsequently unlocked and/or the immobilizer, for example an engine immobilizer, is neutralized.

The radio key is localized, according to the prior art, on the basis of at least one low frequency radio signal or LF signal that can be transmitted from in each case one transmission antenna of the motor vehicle at a frequency of less than for example 200 kHz. A field strength of this LF signal has a standard value. The radio key can detect the field strength of the LF signal arriving at it, for which the distance of the radio key from the at least one transmission antenna of the motor vehicle can then be ascertained. When there are multiple transmission antennas, trilateration can be used to detect the relative position of the radio key. Such a system is known e.g. by the name "PASE" (R) from the Continental (R) company.

What is known as the relay attack involves the pretence to a motor vehicle that a radio key is nearby as a result of two repeaters being operated between the motor vehicle and a radio key that is a long way away, said repeaters forwarding respective radio signals of the motor vehicle and of the radio key to the respective other station, which then emits them again. Therefore, a suitable response can be elicited from the radio key, e.g. by forwarding the challenge signal, said response then being able to be used to manipulate the motor vehicle. The measurement of the field strength of an LF signal can also be recreated thereby without the distance of the two intermediate stations from one another being significant in this case.

The invention is based on the object of reliably verifying the distance of a radio key from a motor vehicle.

The object is achieved by the subjects of the independent patent claims. Advantageous developments of the invention are described by the dependent patent claims, the following description and the figures.

The invention provides a method that is used to verify that a distance of a radio key in relation to a motor vehicle is shorter than a prescribed maximum physical distance. To this end, a control apparatus uses a radio device of the motor vehicle to transmit at least one electromagnetic signal to the radio key and subsequently receives a respective electromagnetic response signal. For each transmitted radio signal, a response signal is thus expected or received. For each radio signal, the radio signal itself and the associated response signal are then taken as a basis in each case for using a signal propagation delay measurement to ascertain a respective signal propagation delay. For a single radio signal, a single value of a signal propagation delay is thus obtained, and in each case one value of a signal propagation delay for each radio signal when there are multiple radio signals. A signal propagation delay measurement correlates the transmitted radio signal with the arriving response signal. Therefore, the signal propagation delay measurement provides an absolute measurement of the time offset between the transmitted radio signal and the received radio signal (response signal). From this, it is also possible to detect the time delay that would arise during a relay attack as a result of the forwarding between the two intermediate stations. In this case, the signal propagation delay measurement assumes that the response signal comes from the radio key, which generates the response signal on the basis of the radio signal of the motor vehicle by virtue of e.g. part of the radio signal being returned in order to allow the correlation between the radio signal and the response signal. To this end, the radio key can have and use e.g. a transceiver.

For each signal propagation delay, a check is performed to determine whether the signal propagation delay has failed to satisfy a predetermined propagation delay criterion. The propagation delay criterion can prescribe a maximum value for the ascertained signal propagation delay. If the ascertained signal propagation delay is greater than this maximum value, then the propagation delay criterion is not satisfied. When the propagation delay criterion is not satisfied, a transgression above the propagation delay is signaled.

The method has the advantage that, with an appropriately chosen propagation delay criterion, a relay attack causes a transgression above the propagation delay that is displayed or detected, as a result of which a manipulation on the basis of a relay attack is detected. A corresponding propagation delay criterion can be ascertained on the basis of simple attempts.

The invention also includes advantageous developments that provide additional advantages.

For a reliable signal propagation delay measurement, the radio device preferably has multiple transceivers, each of which can transmit a radio signal and receive the associated response signal. The control apparatus uses a localization device to ascertain a relative position of the radio key in relation to the motor vehicle. An orientation of the radio key inside the motor vehicle is also detected in this case. On the basis of the ascertained relative position, the control apparatus selects just one or some of the transceivers, that is to say not all the transceivers, to transmit the at least one radio signal and operates said transceiver(s) in each case. Preferably, just a single or just two or three or four transceivers is/are selected. The advantage in this case is that the radio key has to react only to accordingly few radio signals or else only to a single radio signal by generating a response signal. This is energy efficient as far as operation of the radio key is concerned.

In regard to the question of which transceiver is selected, there is provision for the respective transceiver to be selected on the basis of a predetermined visual criterion. The visual criterion demands e.g. a line of sight, unconcealed by metal of the motor vehicle, between the respectively selected transceiver and the radio key. The signal propagation delay measurement becomes reliable as a result. In general, the visual criterion is used to associate the relative position of the radio key, as signaled by the localization device, with a selection of a transceiver or of some transceivers from the transceivers provided on the motor vehicle in total. By way of example, the localization device can indicate one zone from multiple prescribed zones as an indication of the relative position. For each zone, in each case a selection of one or some of the transceivers may then be stipulated. This can be effected on the basis of a table, for example.

To localize the radio key, the localization on the basis of at least one LF signal at a frequency of less than 200 kHz that is known from the prior art can be used (PASE system). This LF signal is transmitted with a prescribed field strength, specifically in each case one LF signal by means of a respective transmission antenna of the localization device. From the radio key, the localization device receives a reception field strength value for each LF signal. From this, the relative position of the radio key can then be ascertained in order to check the visual criterion, for example. As an alternative to the receiving of reception field strength values, there may also be provision for the evaluation to take place in the radio key and for the localization device to receive a position statement from the radio key. The development has the advantage that a locking system with a radio key that is known from the prior art can be used in order to select the at least one transceiver for the signal propagation delay measurement.

A suitable radio signal for the signal propagation delay measurement is a UWB (ultra-wideband, frequency ranges greater than 1 GHz, bandwidth greater than 100 MHz) radio signal and/or the use of a Bluetooth radio signal. A radio signal of said respective type allows a spatial resolution of less than 2 m, in particular less than 1 m, when ascertaining the distance of the radio key from the motor vehicle.

In order to be able to perform the method according to the invention in a motor vehicle, the invention also provides a control apparatus for a motor vehicle. The control apparatus has an electronic circuit configured to perform an embodiment of the method according to the invention. The control apparatus can be in the form of a controller for the motor vehicle, for example. The control apparatus can also be in the form of a distributed circuit in order to be able to perform the signal propagation delay measurement in or on each transceiver of the radio device.

The invention also includes a motor vehicle that has said radio device, which has at least one transceiver for transmitting a respective electromagnetic radio signal and for receiving a respective electromagnetic response signal. In particular, the radio device is configured to transmit a UWB radio signal and/or a Bluetooth radio signal as respective radio signal and to receive a signal of the same signal type as response signal.

The motor vehicle according to the invention is distinguished by an embodiment of the control apparatus according to the invention that is coupled to the radio device.

Preferably, the motor vehicle also has a localization device for ascertaining a relative position of a radio key in relation to the motor vehicle. As a result, in the manner described, the control apparatus can select a single transceiver or some of the transceivers present in total for the signal propagation delay measurement.

The motor vehicle according to the invention is preferably in the form of an automobile, in particular in the form of a passenger vehicle or truck.

In order to be able to perform the signal propagation delay measurement, a radio key for a motor vehicle is also needed as a counterpart for the radio device of the motor vehicle. Said radio key is likewise provided by the invention and has an active transponder unit configured to receive, by means of energy from an energy store of the radio key, for example from a battery, an electromagnetic radio signal from surroundings and to take the radio signal as a basis for returning an electromagnetic response signal to the surroundings. The radio key therefore allows the control apparatus in the motor vehicle to perform said propagation delay measurement.

In particular, the transponder unit is configured to receive a UWB radio signal and/or a Bluetooth radio signal in the manner described and to return it again as a response signal.

An exemplary embodiment of the invention is described below. In this regard, the single FIGURE (FIG.) shows a schematic depiction of an embodiment of a system comprising a motor vehicle and a radio key, the two of which each represent an embodiment of the invention.

The exemplary embodiment explained below is a preferred embodiment of the invention. In the exemplary embodiment, the described components of the embodiment each constitute individual features of the invention that should be considered independently of one another and that in each case also develop the invention independently of one another and should therefore also be regarded as a constituent part of the invention individually or in a different combination to that shown. Furthermore, the embodiment described may also be supplemented by further features of the invention from among those that have already been described.

The FIGURE shows a motor vehicle 10, which may be an automobile, in particular a passenger vehicle or a truck. In the example, a user (not depicted) with a radio key 11 can have approached the motor vehicle 10. For example as a result of operation of a door handle 12, a locking system 13 of the motor vehicle 10 can trigger a check on the radio key 11 in a manner known per se.

For the check, the motor vehicle 10 can have a localization device 14 that can provide for antennas 15 for transmitting a respective LF signal. The respective range of the LF signal of each antenna 15 can result, as shown in the FIGURE, in for example a left-hand zone 16, an interior zone 17, a right-hand zone 18 and a rear zone 19, with which the position of the radio key 11 can be associated in each case. In the radio key 11, the respective reception field strength of each LF signal of the antennas 15 can be measured or detected for this purpose. Each zone 16, 17, 18, 19 then represents in each case one possible relative position of the radio key 11 in relation to the motor vehicle 10, which relative position is detectable by the localization device 14.

In order to verify that signals of the motor vehicle 10 and of the radio key 11 are not forwarded by means of a relay attack 20 and that a radio key 11' that is a long way away is not involved, the motor vehicle 10 can additionally have a radio device 21 that can have multiple transceivers 22, 23 for respectively transmitting a UWB radio signal and/or Bluetooth radio signal and for receiving a corresponding or correlated response signal.

Each transceiver 22, 23 can therefore be used to transmit a radio signal to the radio key 11, for which the latter can use a transponder unit 24 to return a response signal. Owing to the problems of shadowing for the radio signals in the gigahertz transmission range by the motor vehicle 10 itself or else by a person, multiple instances of the transceivers 22, 23 are preferably provided on the motor vehicle 10 for the signal propagation delay measurement.

If, however, there are now multiple UWB transceivers 22, 23 installed in the motor vehicle 10, then the radio key 10 would theoretically need to communicate with each of these transceivers in succession or with staggered timing for the distance measurement, in order to perform a propagation delay measurement with each transceiver. Since the radio key 11 has a higher power requirement for the communication for propagation delay measurement than the key battery 25 can provide, the energy even needs to be buffer-stored in a suitable manner, for example by means of capacitors. The higher the energy requirement, the higher too the subassembly costs for the radio key 11.

In the case of the motor vehicle 10, a way has been found to reduce the energy requirement in the radio key 11 for the propagation delay measurements. In this regard, a decision is taken in the motor vehicle 10 regarding which of the transceivers 22, 23 installed in the motor vehicle 10 are currently supposed to be used to perform the propagation delay measurement for the radio key 11.

This can be effected by the control apparatus 26, which can be in the form of a controller of the motor vehicle 10, for example.

Not every transceiver 22, 23 is used, but rather only a selection of transceivers, in the example the transceivers 23, which are selected by being selected on the basis of the zone in which the radio key 11 has been localized. This ensures that a clear view of the radio key 11 is obtained for the respective electromagnetic radio signal of the transceiver 23.

In this regard, the motor vehicle 10 can use the PASE system, i.e. the localization device 14 by means of which the radio key 11 at the motor vehicle 10 can be localized in relation to the respective zone 16, 17, 18, 19.

UWB signal propagation delay measurement or BLE (Bluetooth Low Energy) signal propagation delay measurement can then be used to measure the distance of the radio key 11 from the motor vehicle 10, in order to fend off the relay attack 20 for unlocking or starting the motor vehicle 10.

In the motor vehicle 10, the LF localization of the localization device 14, for example at 125 kHz (below 200 kHz), is thus initially used to ascertain where the radio key 11 is situated relative to the motor vehicle 10. This localization does not take into consideration the possible relay attack 20, however. In order to detect the relay attack 20, the UWB/BLE propagation delay measurement is performed using as few transceivers 23 as possible, but at least the number of transceivers 23 used is kept below the total number of transceivers 22, 23.

Following the LF localization, a decision is made regarding which of the transceivers 22, 23 is or are supposed to be used to perform the propagation delay measurement. If for example the radio key 11 has been localized in the interior (interior zone 17), then the propagation delay measurement from/to the key can be performed using one or two interior transceivers. The exterior transceivers are then not needed. That is to say that in the radio key 11 it is then necessary to buffer energy for only 2 instead of the depicted 6 transceivers 22, 23 and the performance of the propagation delay measurement using each of these. If the radio key 11 in the exterior has been localized on the left (left-hand zone 16, as depicted), for example, the propagation delay measurement from/to the key is performed using the two transceivers 23 fitted to the motor vehicle 10 on the left. The interior transceivers and the exterior transceivers on the opposite vehicle side of the motor vehicle 10 are then not needed, i.e. again only energy for 2 instead of 6 propagation delay measurements needs to be buffered in the radio key 11.

The reduction in the number of required propagation delay measurements in the gigahertz range (UWB, BLE) results in less energy being needed in the radio key 11 for propagation delay measurement or for the propagation delay measurement. The required energy buffers can be produced using fewer and/or smaller subassemblies. As a result, the radio key 11 can be manufactured less expensively.

By way of example, the propagation delay measurement can be used to detect whether the radio key is within a maximum distance MAX away from the motor vehicle. The value of MAX can be in a range from 1 m to 3 m, for example. Such a propagation delay criterion 27 can be checked by the control apparatus 26, e.g. by means of a microcontroller or a comparison circuit (e.g. on the basis of an operational amplifier) or comparison logic.

If there is a relay attack 20, then a value above a threshold value is obtained for the ascertained propagation delay. This threshold value is obtained for the prescribed value of MAX. The transgression above the propagation delay 28 can be signaled by the control apparatus 26 in the motor vehicle 10.

All in all, the example shows how the invention can use an LF localization as a decision basis for which UWB transceivers are supposed to be used for communication.

LIST OF REFERENCE SIGNS

10 Motor vehicle
11 Radio key
11' Radio key further away than MAX
12 Door handle
13 Locking system
14 Localization device
15 Transmission antenna
16 Left-hand zone
17 Interior zone
18 Right-hand zone
19 Rear zone
20 Relay attack
21 Radio device
22 Transceiver
23 Selected transceiver
24 Transponder unit
25 Energy store
26 Control apparatus
27 Propagation delay criterion
28 Transgression above the propagation delay
MAX Maximum distance

The invention claimed is:

1. A method for verifying a prescribed maximum physical distance of a radio key in relation to a motor vehicle, the motor vehicle comprising:
a radio device, the radio device comprising multiple transceivers, wherein a control apparatus uses the radio device in transmitting at least one electromagnetic radio signal to the radio key;
the at least one electromagnetic radio signal composed to facilitate ascertaining a distance of the radio key from the motor vehicle to a spatial resolution of less than 2 m; and
the control apparatus subsequently:
receives a respective electromagnetic response signal and, for each radio signal, uses the radio signal and the respective response signal in measuring a signal propagation delay and ascertaining a respective signal propagation delay, and
checks whether the signal propagation delay fails to satisfy a predetermined propagation delay criterion, and signals the occurrence of a transgression above the propagation delay when the propagation delay criterion is not satisfied; and
wherein at least one transceiver of the radio device is selected based on a predetermined visual criterion to transmit the at least one electromagnetic radio signal, the predetermined visual criterion comprising a line of sight unconcealed by metal of the motor vehicle, between a respectively selected transceiver and the radio key.

2. The method as claimed in claim 1, wherein the control apparatus uses a localization device configured to ascertain a relative position of the radio key in relation to the motor vehicle and uses the ascertained relative position in selecting and operating at least one of the transceivers in transmitting the at least one electromagnetic radio signal.

3. The method as claimed in claim 2, wherein the control apparatus localizes the radio key by transmitting a respective low frequency signal of prescribed field strength and at a frequency of less than 200 kHz via a respective transmission antenna of the localization device and receiving from the radio key a reception field strength value or a position statement for each low frequency signal.

4. The method as claimed in claim 2, wherein the operating at least one of the transceivers in transmitting the at least one electromagnetic radio signal comprises operating at least two of the transceivers in transmitting at least two electromagnetic radio signals wherein the at least two electromagnetic radio signals are each configured to ascertaining a distance of the radio key from the motor vehicle to a spatial resolution of less than 1 m.

5. The method as claimed in claim 2, wherein the operating at least one of the transceivers in transmitting the at least one electromagnetic radio signal comprises operating at least two of the transceivers in transmitting at least two electromagnetic radio signals, wherein the at least two electromagnetic radio signals are each configured to ascertaining a distance of the radio key from the motor vehicle to a spatial resolution of less than 2 m.

6. The method as claimed in claim 5, wherein the at least two electromagnetic radio signals each have a bandwidth greater than 100 MHz.

7. The method as claimed in claim 1, wherein the at least one radio signal comprises an ultra-wideband radio signal or BLUETOOTH® personal area network radio signal.

8. The method as claimed in claim 1, wherein the least one electromagnetic radio signal is configured to ascertaining a distance of the radio key from the motor vehicle to a spatial resolution of less than 1 m.

9. The method as claimed in claim 1, wherein the electromagnetic radio signal has a bandwidth greater than 100 MHz.

10. The method as claimed in claim 1 wherein the at least one transceiver is configured to transmit the at least one electromagnetic radio signal and receive the respective electromagnetic response signal.

11. A control apparatus for a motor vehicle, wherein the control apparatus comprises an electronic circuit configured to perform a method as claimed in claim 1.

12. A motor vehicle comprising a radio device, the radio device comprising at least one transceiver configured to transmit a respective electromagnetic radio signal and to receive a respective electromagnetic response signal, wherein the radio device comprises a control apparatus as claimed in claim 11 coupled to it.

13. The motor vehicle as claimed in claim 12, wherein the motor vehicle comprises a localization device configured to ascertain a relative position of a radio key in relation to the motor vehicle.

14. A radio key for a motor vehicle, having an active transponder unit configured to:
receive, utilizing energy from an energy store of the radio key, an electromagnetic radio signal from surroundings, the electromagnetic radio signal composed to facilitate ascertaining a distance of the radio key from the motor vehicle to a spatial resolution of less than 2 m,
the active transponder unit further configured to:
use the received electromagnetic radio signal to return an electromagnetic response signal to the surroundings;
wherein the received electromagnetic radio signal is transmitted from at least one transceiver selected based on a predetermined visual criterion,
the predetermined visual criterion comprising a line of sight unconcealed by metal of the motor vehicle, between a respectively selected transceiver and the radio key.

15. The radio key as claimed in claim 14, wherein the least one electromagnetic radio signal is configured to ascertaining a distance of the radio key from the motor vehicle to a spatial resolution of less than 1 m.

16. The radio key as claimed in claim 14, wherein the electromagnetic radio signal has a bandwidth greater than 100 MHz.

17. The radio key for a motor vehicle as claimed in claim 14 wherein the at least one transceiver is configured to transmit the electromagnetic radio signal and receive the electromagnetic response signal.

* * * * *